United States Patent
Bae et al.

(10) Patent No.: US 9,283,952 B2
(45) Date of Patent: Mar. 15, 2016

(54) METHOD AND APPARATUS FOR FAULT MITIGATION IN A TORQUE MACHINE OF A POWERTRAIN SYSTEM

(71) Applicant: GM GLOBAL TECHNOLOGY OPERATIONS LLC, Detroit, MI (US)

(72) Inventors: Bon Ho Bae, Torrance, CA (US); Jihoon Jang, Torrance, CA (US); Yo Chan Son, Torrance, CA (US); Silva Hiti, Redondo Beach, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 13/942,884

(22) Filed: Jul. 16, 2013

(65) Prior Publication Data

US 2015/0025720 A1    Jan. 22, 2015

(51) Int. Cl.
| | |
|---|---|
| *B60W 20/00* | (2006.01) |
| *B60W 10/08* | (2006.01) |
| *B60W 10/06* | (2006.01) |
| *B60K 6/445* | (2007.10) |
| *B60K 6/485* | (2007.10) |
| *B60W 50/02* | (2012.01) |

(52) U.S. Cl.
CPC .............. *B60W 20/10* (2013.01); *B60K 6/485* (2013.01); *B60W 20/50* (2013.01); *B60W 2050/0215* (2013.01); *B60W 2510/0638* (2013.01); *B60W 2510/081* (2013.01); *Y10S 903/902* (2013.01)

(58) Field of Classification Search
USPC ........................................ 701/22–70; 477/37
See application file for complete search history.

(56) References Cited

U.S. PATENT DOCUMENTS

| | | | | |
|---|---|---|---|---|
| 6,359,404 | B1 * | 3/2002 | Sugiyama | B60K 6/48 180/65.25 |
| 6,803,781 | B2 | 10/2004 | Kobayashi et al. | |
| 6,923,158 | B2 * | 8/2005 | Kang | F16H 61/66 123/349 |
| 6,958,620 | B1 | 10/2005 | Kozuki | |
| 7,555,374 | B2 * | 6/2009 | Wu | B60K 6/40 180/65.8 |
| 7,865,287 | B2 * | 1/2011 | Huseman | B60K 6/445 180/165 |
| 8,731,765 | B2 * | 5/2014 | Wang | B60W 50/0205 318/490 |
| 2004/0040375 | A1 * | 3/2004 | Kadota | B60K 6/00 73/115.02 |
| 2004/0133318 | A1 * | 7/2004 | Kang | F16H 61/12 701/33.9 |
| 2009/0112385 | A1 * | 4/2009 | Heap | B60K 6/365 701/22 |
| 2012/0083951 | A1 * | 4/2012 | Yang | B60K 6/445 701/22 |
| 2012/0203405 | A1 * | 8/2012 | Wang | B60W 20/00 701/22 |
| 2013/0165295 | A1 * | 6/2013 | Kabe | F16H 61/6648 477/37 |
| 2014/0244084 | A1 * | 8/2014 | Raftry | B60W 10/02 701/22 |

* cited by examiner

*Primary Examiner* — Rami Khatib
*Assistant Examiner* — Timothy Nesley

(57) ABSTRACT

A powertrain system includes a torque machine rotatably coupled to an internal combustion engine via a pulley mechanism. The torque machine and the internal combustion engine are configured to transfer torque to a driveline and include a first sensor configured to monitor rotation of the engine and a second sensor configured to monitor rotation of the torque machine. The first sensor signally connects to a controller configured to control operation of the torque machine. A method for operating the powertrain system includes employing a signal output from the first sensor to monitor rotation of the torque machine to control operation thereof, said signal output from the first sensor adjusted for a pulley ratio of the pulley mechanism upon detecting a fault associated with the second sensor.

18 Claims, 2 Drawing Sheets

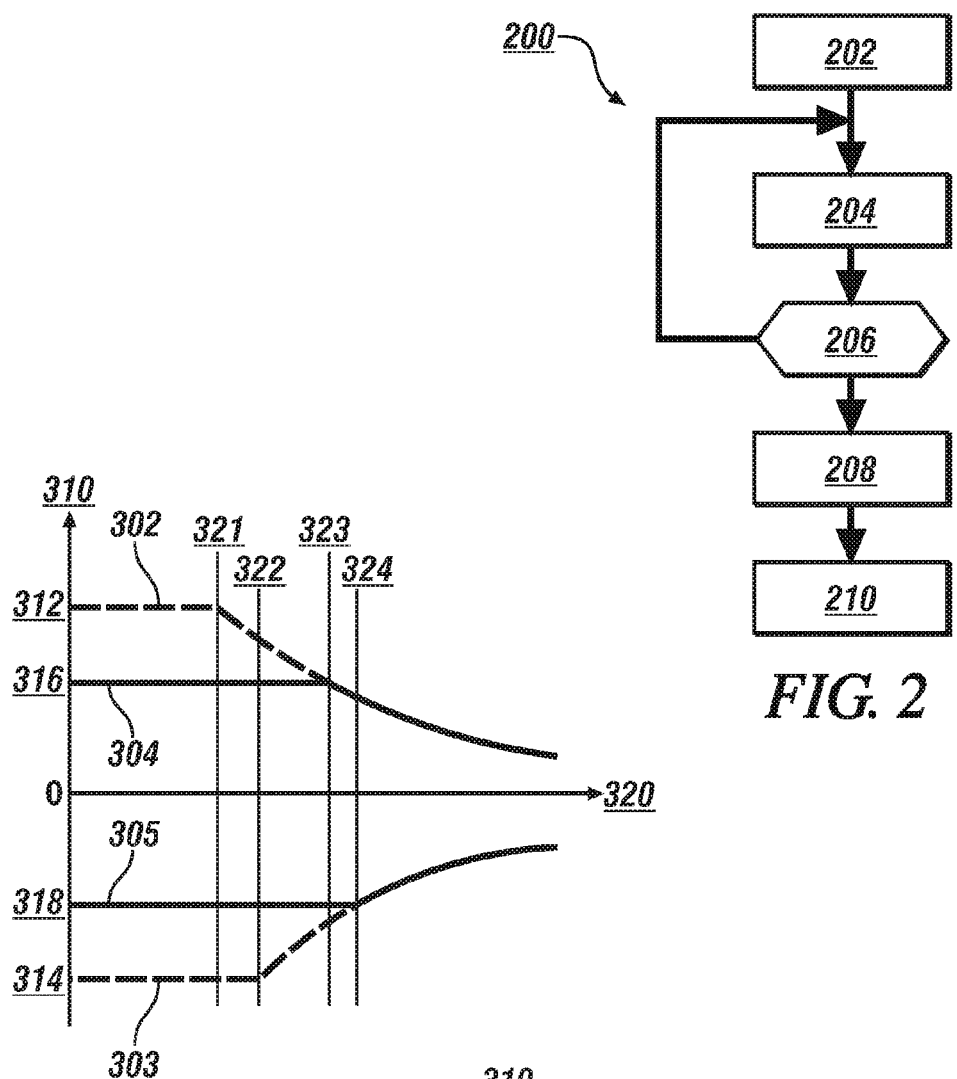
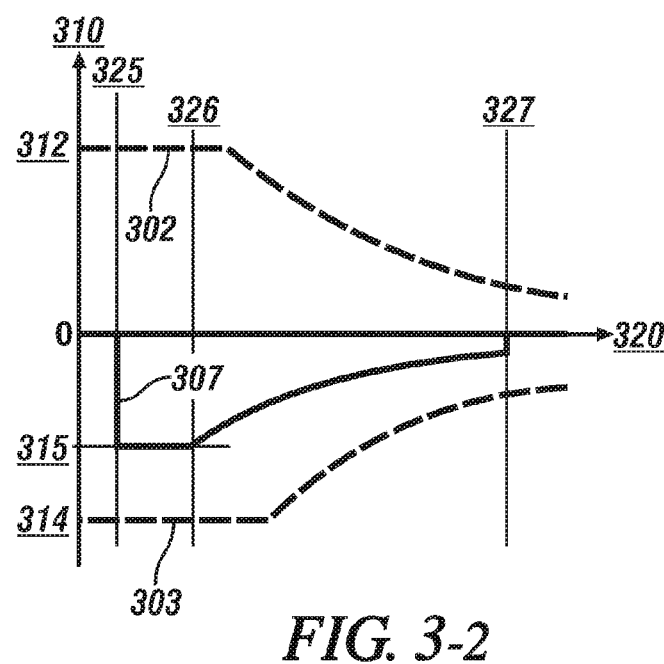

METHOD AND APPARATUS FOR FAULT MITIGATION IN A TORQUE MACHINE OF A POWERTRAIN SYSTEM

TECHNICAL FIELD

This disclosure is related to powertrain systems employing torque machines, internal combustion engines and automatic transmissions.

BACKGROUND

The statements in this section merely provide background information related to the present disclosure and may not constitute prior art.

Vehicle powertrain system systems include one or more torque actuators coupled to transmissions that transfer torque to a driveline for tractive effort. Torque actuators include internal combustion engines and electric motor/generators. An electric motor/generator may be used in a belt-alternator-starter (BAS) system as a torque actuator in place of an alternator. Known BAS systems include a serpentine belt to transfer torque between the engine and the electric motor/generator. Known BAS systems use a high-voltage energy storage system supplying high-voltage electrical power through an inverter to an electric motor/generator.

SUMMARY

A powertrain system includes a torque machine rotatably coupled to an internal combustion engine via a pulley mechanism. The torque machine and the internal combustion engine are configured to transfer torque to a driveline and include a first sensor configured to monitor rotation of the engine and a second sensor configured to monitor rotation of the torque machine. The first sensor signally connects to a controller configured to control operation of the torque machine. A method for operating the powertrain system includes employing a signal output from the first sensor to monitor rotation of the torque machine to control operation thereof, said signal output from the first sensor adjusted for a pulley ratio of the pulley mechanism upon detecting a fault associated with the second sensor.

BRIEF DESCRIPTION OF THE DRAWINGS

One or more embodiments will now be described, by way of example, with reference to the accompanying drawings, in which:

FIG. 2 illustrates a flowchart depicting a sensor fault mitigation scheme to control operation of a powertrain system including an electrically-powered torque machine mechanically coupled to an internal combustion engine, in accordance with the disclosure;

FIG. 3-1 illustrates torque capacity of an exemplary torque machine in relation to rotational speed including depiction of a range of operation with reduced maximum torque capability of the torque machine in both a torque generating mode and an electric power generating mode, in accordance with the disclosure; and FIG. 3-2 illustrates torque capacity of an exemplary torque machine in relation to rotational speed including depiction of a range of operation that is limited to an electric power generating mode with a function of electric power generation to support vehicle electric load, in accordance with the disclosure.

DETAILED DESCRIPTION

Figure 1:
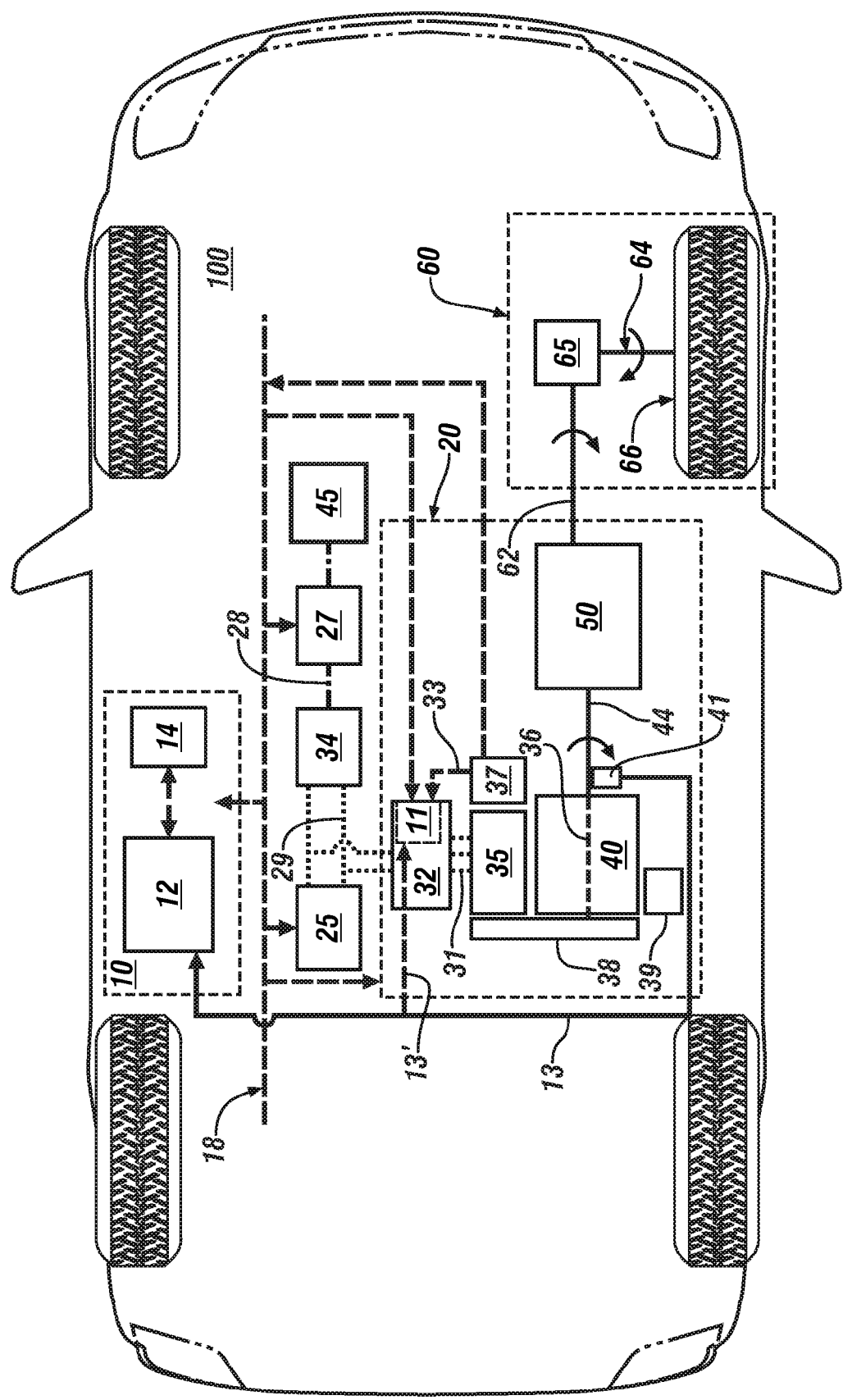
FIG. 1 a vehicle including a powertrain system having an electrically-powered torque machine mechanically coupled to an internal combustion engine that mechanically couples to a transmission and controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. Like numerals refer to like elements throughout the description.

The powertrain system 20 includes an internal combustion engine 40 that mechanically couples to a transmission 50 via an output member 44 coupled to a crankshaft 36 and mechanically couples to an electrically-powered torque machine 35 via a pulley mechanism 38. The electrically-powered torque machine 35 and the internal combustion engine 40 are torque-generating devices. The electrically-powered torque machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the torque machine 35, including transferring torque from the torque machine 35 to the engine 40 for engine autostart/autostop operation, tractive torque assistance, and regenerative braking, and transferring torque from engine 40 to the torque machine 35 for high-voltage electrical charging. In one embodiment, the pulley mechanism 38 includes a serpentine belt routed between the pulley attached to the crankshaft 36 of the engine 40 and another pulley attached to a rotating shaft coupled to a rotor of the torque machine 35, referred to as a belt-alternator-starter (BAS) system. The pulley mechanism 38 is configured with a known pulley ratio K, which defines a ratio between a single rotation of the engine 40 and a quantity of rotations of the torque machine 35. For purposes of defining the pulley ratio K, the engine 40 is considered the drive wheel and the torque machine 35 is considered the driven wheel. The transmission 50 includes an output member 62 that couples to the driveline 60. Alternatively, the pulley mechanism 38 may include a positive-displacement gearing mechanism. The engine 40 may include a low-voltage solenoid-actuated electrical starter 39 for starting in response to a key-crank event in one embodiment.

The engine 40 is preferably a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an output torque request. The sensing devices include a crankshaft position sensor 41, which can be any suitable rotational position sensing system, including by way of example an edge-sensing device such as a magnetoresistive (MR) sensor or a Hall-effect sensor, or another sensing device without limitation. The crankshaft position sensor 41 preferably directly signally connects via a wiring harness 13 to control module 12 and signally connects via a communications bus 18 to inverter controller 11. Alternatively, the crankshaft position sensor 41 directly signally connects via wiring harness 13 to control module 12 and directly signally connects via a second wiring harness 13' to inverter controller 11.

The torque machine 35 is preferably a high-voltage multi-phase electric motor/generator configured to convert stored electric energy to mechanical power and convert mechanical power to electric energy that may be stored in a high-voltage battery 25. The torque machine 35 includes a rotor and a stator and an accompanying position sensor 37 which is a resolver in one embodiment. The resolver 37 is a variable reluctance induction machine including a resolver stator and a resolver rotor that are assembled onto the rotor and stator, respectively, of the torque machine 35. The resolver 37 signally connects directly to the inverter controller 11 via harness 33 and is employed to monitor rotational position of the rotor of the torque machine 35. The rotational position of the rotor of the torque machine 35 is used by the inverter controller 11 to control operation of an inverter module 32 that controls the torque machine 35. The inverter controller 11 is preferably co-located within the inverter module 32 as shown or, alternatively, may be remotely located, e.g., within control module 12.

The high-voltage battery 25 electrically connects to the inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulse width-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. It is appreciated that the inverter module 32 is configured to receive motor control commands and control inverter states to provide the motor drive and regeneration functionality.

In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 may electrically connect to an auxiliary power system 45 to provide low-voltage electric power to low-voltage systems on the vehicle, including, e.g., electric windows, HVAC fans, seats, and the low-voltage solenoid-actuated electrical starter 39 in one embodiment. Alternatively, the electric power converter 34 may provide low-voltage electric power to the low-voltage systems on the vehicle, thus supplanting the auxiliary power system 45.

The transmission 50 preferably includes one or more differential gear sets and activatable clutches configured to effect torque transfer in one of a plurality of fixed-gear operating modes over a range of speed ratios between the engine 40 and the output member 62. The transmission 50 includes any suitable configuration, and is preferably configured as an automatic transmission to automatically shift between the fixed-gear operating modes to operate at a gear ratio that achieves a preferred match between an output torque request and an engine operating point. The transmission 50 automatically executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. An inaccurate matching of engine speed and torque with transmission speed and torque may result in a sag in vehicle speed or torque output or clutch slippage upon execution of a transmission shift event. The driveline 60 may include a differential gear device 65 that mechanically couples to an axle 64 or half-shaft that mechanically couples to a wheel 66 in one embodiment. The driveline 60 transfers tractive power between the transmission 50 and a road surface. The powertrain system 20 is illustrative, and the concepts described herein apply to other powertrain systems that are similarly configured.

The control system 10 includes control module 12 that signally connects to an operator interface 14. The control module 12 preferably signally and operatively connects to individual elements of the powertrain system 20 either directly or via the communications bus 18. The control module 12 signally connects to the sensing devices of each of the high-voltage battery 25, the inverter module 32, the torque machine 35, the engine 40, and the transmission 50 to monitor respective operations. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch. One vehicle operator command of interest is the output torque request, which may be determined via operator inputs to the accelerator pedal and the brake pedal.

The powertrain system 20 includes a communications scheme including the communications bus 18 to effect communications in the form of sensor signals and actuator command signals between the control system 10 and elements of the powertrain system 20. The communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

FIG. 2 is a flowchart depicting a sensor fault mitigation scheme 200 executed to control operation of a powertrain system including a high-voltage electrically-powered torque machine mechanically coupled to an internal combustion engine that includes a first sensor configured to monitor rotation of the engine and a second sensor configured to monitor rotation of the torque machine, e.g., the powertrain system 20 described with reference to FIG. 1. The first sensor signally connects to a control module, e.g., the control module 12, which communicates engine rotational speed to an inverter controller operative to control operation of the torque machine, and the sensor fault mitigation scheme 200 provides a method for operating the torque machine when a fault in the second sensor is detected. Overall, the sensor fault mitigation scheme 200 includes employing the first sensor to monitor rotational position of the internal combustion engine, and upon detecting a fault associated with the second sensor, monitoring rotation of the torque machine using engine rotation information from the first sensor adjusted for a pulley ratio of a device coupling the torque machine to the internal combustion engine. Table 1 is provided as a key to FIG. 2 wherein the numerically labeled blocks and the corresponding functions are set forth as follows, corresponding to the sensor fault mitigation scheme 200.

TABLE 1

| BLOCK | BLOCK CONTENTS |
|---|---|
| 202 | Operate powertrain system |
| 204 | Monitor |
| 206 | Fault? |
| 208 | Use $\omega_{engine}$ for motor control |
| 210 | Mitigate by limiting regenerating torque and motor torque |

The sensor fault mitigation scheme 200 is regularly executed during ongoing powertrain operation (202), and includes monitoring operation and signal outputs from the first and second sensors, e.g., the crankshaft position sensor 41 and the resolver 37 (204) with an intention of detecting presence or absence of a resolver-related fault (206). Resolver-related faults can include either a short circuit or an open circuit in the resolver circuit, and can be caused by wiring pinching, water intrusion and corrosion, a connector fault, or another fault that causes a signal output from the resolver to become unreliable. Methods for detecting electrical faults in resolvers are known and not described in detail herein.

Upon detecting presence of a resolver-related fault (206) (1), the inverter controller 11 discontinues using signal output from the resolver 37 and substitutes signal output from the crankshaft position sensor 41 ($\omega_{engine}$) to control operation of the inverter module 32 to control the torque machine 35 (208). The inverter controller 11 can mitigate risk associated with using the signal output from the crankshaft position sensor 41 to control operation of the inverter module 32 by derating the operation of the torque machine 35 to limit regenerating torque and motor torque (210). Regenerating torque of the torque machine 35 refers to an electric power/mechanical torque exchange through the torque machine 35 that generates electric power, with the electric power employed to charge the high-voltage battery 25 and/or to supply electric power to the DC/DC electric power converter 34 electrically connected to the low-voltage bus 28 to charge the low-voltage battery 27 and supply low-voltage electric power to the auxiliary power system 45 to provide low-voltage electric power to low-voltage systems on the vehicle. Motor torque of the torque machine 35 refers to an electric power/mechanical torque exchange through the torque machine 35 that generates torque, with the torque transferred to the engine crankshaft 36 via the pulley mechanism 38 to effect engine autostart and to supplement engine torque transfer to the transmission 50. Employing information from the crankshaft position sensor 41 to control operation of the inverter module 32 to control the torque machine 35 (208) includes determining motor position and speed using information from the crankshaft position sensor 41, and employing the determined motor position and speed for motor control. The motor speed and motor position can be determined in accordance with the following relationships:

$$\omega_{motor\_calc} = k \cdot \omega_{engine} \quad [2]$$

$$\theta_{motor\_calc} = \int k \cdot \omega_{engine} dt \quad [2]$$

wherein
$\omega_{motor\_calc}$ is the calculated motor speed;
$\omega_{engine}$ is the engine speed, as measured by the crankshaft position sensor;
$\theta_{motor\_calc}$ is the calculated motor position; and
k represents a pulley ratio defining rotation of the torque machine relative to the engine, e.g., the pulley ratio K described with reference to FIG. 1.

There may be a communications delay when engine rotational position and speed information is communicated via the communications bus 18. Furthermore, if the pulley mechanism 38 includes a serpentine or other form of belt system, the engine speed may not perfectly match the motor speed due to slippage and other dynamics. The inverter controller 11 can mitigate risk associated with using the signal from the crankshaft position sensor 41 to control operation of the inverter module 32 by derating the operating range of the torque machine 35 to avoid operating the torque machine in a region that leads to a slip condition (210). In one embodiment, derating the operating range of the torque machine 35 includes operating with reduced maximum torque capability of the torque machine 35 in both a torque generating mode and an electric power generating mode, as shown with reference to FIG. 3-1. This includes permitting operation of the torque machine 35 in both the torque generating mode and the electric power generating mode, albeit at limited power capacity. In one embodiment, derating the operation of the torque machine 35 includes operating with reduced maximum torque capability of the torque machine 35 only in an electric power generating mode to generate electric power to support vehicle electric load, as shown with reference to FIG. 3-2.

FIG. 3-1 graphically shows torque capacity of an exemplary torque machine, including maximum and minimum torque outputs shown on the vertical y-axis 310 in relation to rotational speed, shown on the horizontal x-axis 320, and depicting a range of operation with reduced maximum torque capability of the torque machine in both a torque generating mode and an electric power generating mode. Plotted data includes a maximum motor torque output curve 302 corresponding to the torque generating mode and a maximum electric or regenerative power output curve 303 corresponding to the electric power generating mode, both shown in relation to motor speed for an exemplary torque machine operating at full torque capability. Plotted data also includes a derated motor torque output curve 304 and a derated regenerative power output curve 305 in relation to motor speed over the full range of motor speeds for an exemplary torque machine operating at a derated torque capability. The maximum motor torque output curve 302 includes a maximum torque output 312 that is constant at low speeds, and begins to decrease at break speed 321. Similarly, the maximum regenerative power output curve 303 includes a maximum regenerative power 312 that is constant at low speeds and begins to decrease at break speed 322, with break speed 322 at or near break speed 321. This operation is characteristic for an electric machine. The derated motor torque output curve 304 includes a derated maximum torque output 316 that is substantially less than the maximum torque output 312 that is constant at low speeds, and begins to decrease at break speed 323 when the derated maximum torque output 316 coincides with the maximum motor torque output curve 302. The derated break speed 323 is greater than the break speed 321. The derated regenerative power output curve 305 includes a derated maximum regenerative power output 318 that is substantially less than the maximum regenerative power output 314, is constant at low speeds, and begins to decrease at speed 324 when the derated maximum regenerative power output 318 coincides with the maximum regenerative power output curve 303, with speed 324 at or near to speed 323. A powertrain system that is configured as described herein can operate an embodiment of the torque machine with reduced maximum torque capability in an electric power generating mode to generate electric power to support vehicle electric load(s) in presence of a resolver-related fault employing embodiments of the derated motor torque output curve 304, the derated regenerative power output curve 305 and an embodiment of the sensor fault mitigation scheme 200 described with reference to FIG. 2.

FIG. 3-2 graphically shows capacity of an exemplary torque machine, including minimum and maximum torque outputs, shown on the vertical y-axis 310 in relation to rotational speed, shown on the horizontal x-axis 320, and depicting a range of operation that is limited to only the electric power generating mode with a reduced maximum torque capability that generates electric power to support vehicle electric loads. The plotted data includes the maximum motor torque output curve 302 and the maximum regenerative power output curve 303 for an exemplary torque machine operating at full torque capability. Plotted data also includes a derated regenerative power output curve 307 in relation to motor speed. The exemplary torque machine is restricted to operating only in an electric power generating mode and is prevented from operating to generate motor torque. The derated regenerative power output curve 307 includes a derated maximum regenerative power output 315 that is substantially less than the maximum regenerative power output 314, is constant at low speeds that are greater than the minimum speed 325, and begins to decrease at speed 326, and ends at speed 327, which is less than a overall maximum achievable motor speed. The torque machine does not generate electric power when motor speed is less than minimum speed 325 or greater than maximum speed 327. A powertrain system that is configured as described herein can operate an embodiment of the torque machine with reduced maximum torque capability in an electric power generating mode to generate electric power to support vehicle electric load(s) in presence of a resolver-related fault employing an embodiment of the derated regenerative power output curve 307 and an embodiment of the sensor fault mitigation scheme 200 described with reference to FIG. 2.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including an internal combustion engine rotatably coupled to a torque machine via a pulley mechanism, said torque machine and internal combustion engine configured to transfer torque to a driveline and including a first sensor configured to monitor rotation of the engine and a second sensor configured to monitor rotation of the torque machine, the first sensor signally connected to a controller configured to control operation of the torque machine, the method comprising:
  upon detecting a fault associated with the second sensor, employing a signal output from the first sensor to monitor rotation of the torque machine to control operation thereof, said signal output from the first sensor adjusted for a pulley ratio of the pulley mechanism, including;
    derating the operation of the torque machine to a reduced maximum torque capability by reducing a maximum electric power capability of the torque machine upon detecting the fault associated with the second sensor; and
    operating the torque machine with the reduced maximum torque capability to generate electric power to support a vehicle electric load including limiting regenerating torque output from the torque machine to effect battery charging based upon the reduced maximum electric power capability.

2. The method of claim 1, wherein employing the signal output from the first sensor to monitor rotation of the torque machine to control operation thereof further comprises:
  limiting regenerating torque output from the torque machine to react driveline torque based upon the reduced maximum electric power capability.

3. The method of claim 1, wherein employing the signal output from the first sensor to monitor rotation of the torque machine to control operation thereof further comprises:
  limiting motor torque output from the torque machine based upon the reduced maximum electric power capability.

4. The method of claim 3, wherein limiting the motor torque output from the torque machine based upon the reduced maximum electric power capability comprises limiting the motor torque output from the torque machine to effect engine autostart.

5. The method of claim 3, wherein limiting the motor torque output from the torque machine based upon the reduced maximum electric power capability comprises limiting the motor torque output from the torque machine to effect vehicle propulsion.

6. The method of claim 1, wherein employing the signal output from the first sensor to monitor rotation of the torque machine to control operation thereof further comprises:
  restricting operation of the torque machine to operate only in a regenerating torque output mode to generate electric power to support low-voltage electric loads based upon the reduced maximum electric power capability.

7. The method of claim 1, wherein employing a signal output from the first sensor to monitor rotation of the torque machine to control operation thereof, said signal output from the first sensor adjusted for a pulley ratio of the pulley mechanism comprises determining a speed of the torque machine in accordance with the following relationship:

$$\omega_{motor\_calc} = k \cdot \omega_{engine}$$

wherein
  $\omega_{motor\_calc}$ is the motor speed,
  $\omega_{engine}$ is the signal output from the first sensor, and
  k is the pulley ratio.

8. The method of claim 1, wherein employing a signal output from the first sensor to monitor rotation of the torque machine to control operation thereof, said signal output from the first sensor adjusted for a pulley ratio of the pulley mechanism comprises determining a rotational position of the torque machine in accordance with the following relationship:

$$\theta_{motor\_calc} = \int k \cdot \omega_{engine} dt$$

wherein $\omega_{engine}$ is the signal output from the first sensor, $\theta_{motor\_calc}$ is the rotational position of the torque machine, and k is the pulley ratio.

9. The method of claim 1, wherein the torque machine comprises a high-voltage induction motor.

10. Method for operating a powertrain system including an internal combustion engine rotatably coupled to a torque machine via a pulley mechanism, said torque machine and internal combustion engine configured to transfer torque to a driveline and including a first sensor configured to monitor rotation of the engine and a second sensor configured to monitor rotation of the torque machine, the first sensor directly signally connected to a first controller configured to control operation of the engine and the second sensor the first sensor signally connected to a second controller configured to control operation of the torque machine, the method comprising:

upon detecting a fault associated with the second sensor, employing a signal output from the first sensor to monitor rotation of the torque machine to control operation thereof, said signal output from the first sensor adjusted for a pulley ratio of the pulley mechanism, including;

derating the operation of the torque machine to a reduced maximum torque capability by reducing a maximum electric power capability of the torque machine upon detecting the fault associated with the second sensor; and operating the torque machine with the reduced maximum torque capability to generate electric power to support a vehicle electric load including limiting regenerating torque output from the torque machine to effect battery charging based upon the reduced maximum electric power capability.

11. The method of claim 10, wherein employing the signal output from the first sensor to monitor rotation of the torque machine to control operation thereof further comprises:

limiting regenerating torque output from the torque machine to react driveline torque based upon the reduced maximum electric power capability.

12. The method of claim 10, wherein employing the signal output from the first sensor to monitor rotation of the torque machine to control operation thereof further comprises:

limiting motor torque output from the torque machine based upon the reduced maximum electric power capability.

13. The method of claim 12, wherein limiting the motor torque output from the torque machine based upon the reduced maximum electric power capability comprises limiting the motor torque output from the torque machine to effect engine autostart.

14. The method of claim 12, wherein limiting the motor torque output from the torque machine based upon the reduced maximum electric power capability comprises limiting the motor torque output from the torque machine to effect vehicle propulsion.

15. The method of claim 10, wherein employing the signal output from the first sensor to monitor rotation of the torque machine to control operation thereof further comprises:

restricting operation of the torque machine to operate only in a regenerating torque output mode to generate electric power to support low-voltage electric loads based upon the reduced maximum electric power capability.

16. The method of claim 10, wherein employing a signal output from the first sensor to monitor rotation of the torque machine to control operation thereof, said signal output from the first sensor adjusted for a pulley ratio of the pulley mechanism comprises determining a speed of the torque machine in accordance with the following relationship:

$$\omega_{motor\_calc} = k \cdot \omega_{engine}$$

wherein $\omega_{motor\_calc}$ is the motor speed, $\omega_{engine}$ is the signal output from the first sensor, and k is the pulley ratio.

17. The method of claim 10, wherein employing a signal output from the first sensor to monitor rotation of the torque machine to control operation thereof, said signal output from the first sensor adjusted for a pulley ratio of the pulley mechanism comprises determining a rotational position of the torque machine in accordance with the following relationship:

$$\theta_{motor\_calc} = \int k \cdot \omega_{engine} dt$$

wherein $\omega_{engine}$ is the signal output from the first sensor, $\theta_{motor\_calc}$ is the rotational position of the torque machine, and k is the pulley ratio.

18. The method of claim 10, wherein the torque machine comprises a high-voltage induction motor.

* * * * *